United States Patent [19]

Sanders et al.

[11] Patent Number: 5,021,113
[45] Date of Patent: Jun. 4, 1991

[54] TIE LAYER COMPOSITION AND LAMINATED STRUCTURES CONTAINING SAME

[75] Inventors: Andrea Sanders, Katy; Glenn R. Himes, Houston, both of Tex.

[73] Assignee: Shell Oil Company, Houston, Tex.

[21] Appl. No.: 542,687

[22] Filed: Jun. 25, 1990

Related U.S. Application Data

[60] Continuation of Ser. No. 425,154, Oct. 23, 1989, abandoned, which is a division of Ser. No. 139,549, Dec. 30, 1987, Pat. No. 4,898,784.

[51] Int. Cl.$^5$ ............... C09J 153/02; C08L 53/02
[52] U.S. Cl. ............... 156/334; 525/74; 525/89
[58] Field of Search ............... 525/89, 74, 78; 156/334

[56] References Cited

U.S. PATENT DOCUMENTS

| 3,686,365 | 8/1972 | Sequeira | 525/89 |
| 4,359,551 | 11/1982 | Suda | 525/74 |
| 4,400,478 | 8/1983 | Gergen | 525/89 |
| 4,849,471 | 7/1989 | Saito | 525/89 |

FOREIGN PATENT DOCUMENTS

| 117559 | 7/1982 | Japan | 525/89 |
| 019376 | 2/1983 | Japan | 525/74 |

Primary Examiner—John C. Bleutge
Assistant Examiner—David Buttner

[57] ABSTRACT

An adhesive composition comprising a plurality of selectively hydrogenated block copolymers, each of said block copolymers comprising at least one polymeric block containing predominantly monoalkenyl aromatic hydrocarbon monomer units and at least one polymeric block containing predominantly conjugated diolefin monomer units, at least one of which block copolymers is carboxylated and at least one of which block copolymers is not carboxylated and laminated structures comprising a plurality of polymeric layers tied together with said adhesive composition. The adhesive composition contains a relatively minor amount of carboxyl groups, on average, per polymer chain in the composition and is particularly useful in the preparation of laminated structures via coextrusion or similar processes, wherein the various layers are brought together in the molten phase while in motion, when one or more layers in the laminated structure comprises a polar group reactive with the carboxyl groups. Laminated structures prepared with the adhesive composition can be prepared and processed at higher temperatures than similar laminated structures heretofore known.

9 Claims, No Drawings

TIE LAYER COMPOSITION AND LAMINATED STRUCTURES CONTAINING SAME

This is a continuation of application Ser. No. 425,154 filed Oct. 23, 1989, now abandoned, which is a divisional of Ser. No. 139,549, filed Dec. 30, 1987, now U.S. Pat. No. 4,898,784.

BACKGROUND OF THE INVENTION

1. Field of the Invention

This invention relates to a tie layer composition and to laminated structures comprising the same. More particularly, this invention relates to a tie layer composition comprising a blend of carboxylated and uncarboxylated polymer and to laminated structures comprising a plurality of polymeric layers bonded together with said tie layer composition.

2. Prior Art

Laminated structures comprising a plurality of polymeric layers are, of course, well known in the prior art. Such structures are taught, for example, in U.S. Pat. Nos. 4,058,647; 4,198,327; 4,298,712; 4,332,858; 4,341,837 and 4,588,648 and in Japanese Patent Application No. Sho 58 [1983]-13242. In general, laminated structures comprising a plurality of polymeric layers are fabricated for the purpose of obtaining a single structure having the advantages of each of the separate layers. Before such structures will perform successfully, however, it is important that the various layers be suitably adhered one to the other so as to avoid separation (delamination) during use. Heretofore, several methods have been proposed for effecting such suitable adherents of layers. For example, U.S. Pat. No. 4,198,327 teaches that various polar materials which include polycarbonates and saponification products of an ethylene/vinyl acetate copolymers may be satisfactorily bonded with a composition comprising a predominant amount of a carboxylated crystalline polyolefin and a minor amount of a hydrocarbon elastomer. Inclusion of a small amount of the hydrocarbon elastomer in the composition improved the adhesion of the polyolefin to the polar materials. Similarly, U.S. Pat. No. 4,058,647 teaches that certain polymeric materials, including ethylenic/vinyl alcohol copolymers, may be laminated with a composition comprising both a modified and an unmodified polyolefin and a rubber component. U.S. Pat. No. 4,298,712 also teaches that good adhesion can be obtained with a composition comprising a modified high density polyethylene, a polyethylene resin and an elastomer. U.S. Pat. Nos. 4,332,858 and 4,341,837 teach that various polymeric materials including olefin homopolymers, olefin copolymers such as ethylene and vinyl alcohol, polycarbonates and the like may be adhered with a modified, but unhydrogenated, block copolymer such as a maleated block copolymer of styrene and butadiene. U.S. Pat. No. 4,588,648 teaches that certain polymeric materials such as polypropylene and ethylene/vinyl alcohol copolymers may be laminated with an adhesive layer comprising a grafted copolymer of an olefin and maleic anhydride and an ungrafted polypropylene. Japanese Patent Application No. Sho 58 [1983]-13242 teaches that various polymeric materials such as olefin homopolymers, olefin copolymers such as ethylene/vinyl alcohol, polycarbonates and the like may be tied in a laminated structure with an adhesive comprising a modified crystalline olefin-based polymer which adhesive may also comprise an unhydrogenated block copolymer of styrene and butadiene.

As is well known, many of the adhesive compositions heretofore proposed have been effective for producing laminated structures having a broad range of applications. Many of the adhesive compositions proposed heretofore, particularly those comprising modified polyolefins either alone or in combination with unmodified polyolefins and a minor amount of elastomer generally do not act as a compatibilizer for reground scrap of laminates prepared therewith. Thus direct reuse of any excess of such laminate as by way of a regrind layer in the laminate or in other applications such as in the fabrication of molded structures is not generally possible. Moreover, laminated structures comprising unsaturated elastomers are, generally, not thermally stable and cannot effectively be used when the method used to prepare the laminated structure involves temperatures at or above the temperature at which degradation of the unsaturated elastomer occurs. Further, many of the adhesive compositions heretofore proposed do not permit high temperature finishing or thermoforming or use of the laminated structure in applications requiring high temperature operations such as retorting, hot filling and the like. As a result, laminated structures prepared with such adhesive compositions cannot be used in those applications requiring high temperature finishing or use. In light of these deficiencies, then, the need for an adhesive composition which can be used to prepare laminates of various polymeric materials which produce compatible laminates and which can be prepared, finished and used without severe temperature limitations is believed to be readily apparent.

Adhesive and similar compositions which may, at least, comprise a hydrogenated block copolymer containing at least one monoalkenyl aromatic hydrocarbon block and at least one conjugated diolefin block, which adhesive compositions are useful over a broader range of temperatures, are, of course, known in the prior art. Such adhesive and similar compositions are taught, for example, in U.S. Pat. Nos. 3,607,977 and 3,970,771 and in European Patent Application No. 0169987. U.S. Pat. No. 3,607,977 teaches compositions comprising a block copolymer containing at least two monoalkenyl aromatic hydrocarbon polymer blocks and at least one conjugated diolefin polymer block and a block copolymer comprising at least one monoalkenyl aromatic hydrocarbon polymer block and at least one conjugated diolefin block wherein at least 10% of the initial unsaturation is reacted so as to incorporate a polar group. The block copolymers may, independently, be neat or hydrogenated. The polar group may, inter alia, be an oxygen containing group such as a carboxyl group. According to this patent, compositions comprising an oxygen containing group are especially useful as adhesives, particularly for polar textiles such as cellulose. U.S. Pat. No. 3,970,771 teaches a primer coating composition comprising a selectively hydrogenated block copolymer having at least two monoalkenyl aromatic hydrocarbon polymer blocks and at least one hydrogenated polymer block of a conjugated diolefin, a substantial portion of a resin compatible with the monoalkenyl aromatic hydrocarbon blocks and, optionally, a substantial portion of certain carboxylated resins. The primer is useful for bonding various coating materials to substrates having low energy surfaces such as substrates which are essentially hydrocarbon. European Patent Application No. 0169987 teaches an adhesive composition comprising a copolymer of an olefin and an ethylenically unsaturated carboxylic acid, and, optionally, an elastomer which may be a hydrogenated block copolymer of a conjugated diolefin and a vinyl aromatic hydrocarbon compound. The adhesive composition may be used to bond a polymer layer such as a polyamide or a polyester to a metallic screen. While certain of the adhesive compositions taught by these patents would be useful over a broader range of temperatures than those containing ethylenically unsaturated polymers heretofore used in the preparation of polymeric laminates, there is no indication that such adhesives would be useful in the preparation of such polymeric laminates, particularly polymeric laminates comprising polar and non-polar polymeric layers. Moreover, adhesive compositions containing a relatively large concentration of carboxyl groups have been found to be deficient when used as a tie layer in laminated structures comprising at least one layer containing polar groups which are reactive with carboxyl groups, at least when the laminate is prepared by bringing the various layers together in the molten phase while the various layers are in motion. The need, then, for an improved adhesive composition for preparing laminated structures containing at least one layer having polar groups which are reactive with carboxyl groups continues, particularly when the laminated structures are prepared by bringing the various layers together in the molten phase while the various layers are in motion.

SUMMARY OF THE INVENTION

It has now been discovered that the foregoing and other disadvantages of the prior art adhesive compositions can be overcome or at least significantly reduced with the adhesive composition of this invention and an improved laminated structure comprising a plurality of polymeric layers, at least one of which contains a polar group reactive with a carboxyl group, prepared by bringing the various layers together in the molten phase while the various layers are in motion, provided therewith. It is, therefore, an object of the present invention to provide an improved adhesive composition for use in the preparation of polymeric laminates. It is yet another object of this invention to provide such an improved adhesive composition which can be used to produce polymeric laminates having improved compatibility. It is still another object of this invention to provide such an improved adhesive composition which can be used at relatively high temperatures without degradation thereof. It is yet another object of this invention to provide polymeric laminates prepared with the improved adhesive composition of this invention. It is still a further object of this invention to provide a laminated structure which can be prepared by bringing the various layers together in the molten phase while the various layers are in motion. It is a still further object of this invention to provide polymeric laminates that can be prepared, finished and used at relatively high temperatures. The foregoing and other objects and advantages will become apparent from the description set forth hereinafter and the examples contained therein.

In accordance with the present invention, the foregoing and other objects and advantages are accomplished by using an adhesive composition comprising a plurality of selectively hydrogenated block copolymers having at least one polymeric block containing predominantly monoalkenyl aromatic hydrocarbon monomer units and at least one polymeric block containing predominantly conjugated diolefin monomer units. At least one of the selectively hydrogenated block copolymers will be modified by incorporating carboxylic acid groups therein and at least one of the selectively hydrogenated block copolymers will be unmodified. Each of the polymeric layers contained in the laminated structure may be the same or a different polymeric material but at least one will contain polar groups reactive with a carboxyl group. The selectively hydrogenated block copolymer which is modified may be modified using conventional technology.

DETAILED DESCRIPTION OF THE INVENTION

As indicated supra, the present invention relates to a laminated structure comprising a plurality of polymeric layers bonded together with an adhesive composition comprising a plurality of block copolymers having at least one polymeric block containing predominantly monoalkenyl aromatic hydrocarbon monomer units and at least one polymeric block containing predominantly conjugated diolefin units and to the adhesive composition used in said laminated structure. At least one of the selectively hydrogenated block copolymers will be modified by incorporating carboxylic acid groups therein while at least another of said block copolymers will be unmodified. The polymeric layers contained in the laminated structure may be the same or different polymeric materials but at least one will contain polar groups which are reactive with carboxyl groups.

In general, the block copolymers useful in the adhesive composition of this invention will be selectively hydrogenated block copolymers which may be linear or radial and which prior to hydrogenation or other modification thereof may be represented by one of the following general formulae:

$$A_x\text{-}(B\text{-}A)_y\text{-}B_z; \text{ and}$$

$$[A_x\text{-}(B\text{-}A)_y\text{-}B_z]_n\text{-}C$$

Wherein:
x and z are, independently, a number equal to 0 or 1;
y is a number from 1 to about 15;
n is a number from 3 to about 15 as determined by GPC on a polystyrene scale;
C is a poly (polyfunctional coupling agent) nucleus;
A is a polymeric block comprising predominantly monoalkenyl aromatic hydrocarbon monomer units; and
B is a polymeric block containing predominantly conjugated diolefin monomer units which are selectively hydrogenated.

Unhydrogenated, linear block copolymers of the type illustrated by the first of the foregoing general equations may be prepared in accordance with techniques well known in the prior art such as those described in U.S. Pat. Nos. 231,635; 2,265,765; and 3,322,856, the disclosure of which patents are herein incorporated by reference. Radial polymers of the type illustrated by the second of the foregoing general formula may also be prepared using techniques well known in the prior art such as those disclosed in U.S. Pat. Nos. 3,985,830 and 4,156,673, the disclosure of which patents are also herein incorporated by reference.

The block copolymers useful in the adhesive composition of this invention will be selectively hydrogenated. In general, the selective hydrogenation will be accomplished so as to selectively hydrogenate at least about 80% of the ethylenic unsaturation initially contained in the copolymer, preferably such that at least about 95% of the initial ethylenic unsaturation is hydrogenated. Selective hydrogenation of the block copolymer increases the block copolymer's resistance to temperature and thereby permits higher temperature application of the adhesive composition of this invention. Moreover, due to this temperature resistance, the adhesive composition of this invention may be used in coextrusion and similar processes with a broader range of polymeric materials than has heretofore been possible with adhesive compositions comprising unhydrogenated block copolymers. Consistent with this, laminated structures prepared with the adhesive compositions of this invention can, frequently, be thermoformed, retorted, hot filled and the like at temperatures above those heretofore usable with such laminated structures. Still further, regrind of laminated structures prepared with the adhesive compositions of this invention exhibit improved polymer compatibility and, as a result, excess amounts of the laminated structures, including the waste therefrom, may be recycled or used in a broad range of molding applications.

As indicated supra, A in the general formulae set forth above is a polymeric block containing predominantly monoalkenyl aromatic hydrocarbon monomer units and B is a polymeric block containing predominantly conjugated diolefin monomer units, which B block will, ultimately, be hydrogenated. As used herein in connection with polymer block structure, the recitation "predominantly" shall mean that the respective polymeric block will comprise at least about 85 wt% of the specified monomer units in the polymer block. In this regard, it should be noted that in the predominantly monoalkenyl aromatic hydrocarbon polymer block, other monomers such as conjugated diolefin may be present. When other monomers are present in the monoalkenyl aromatic hydrocarbon polymer block, the resulting copolymer may be random, tapered or block. Similarly, in the predominantly conjugated diolefin polymeric block, other monomers such as monoalkenyl aromatic hydrocarbon monomers may be present. When other monomers are present in the conjugated diolefin block, this block, too, may itself be random, tapered or block.

In general, any of the monoalkenyl aromatic hydrocarbon monomers known to be useful in block copolymers of this type, such as those disclosed in the above-identified U.S. Patents, may be used in the block copolymers useful in the adhesive composition of this invention. Suitable monoalkenyl aromatic hydrocarbon monomers, then, include styrene, alkyl-substituted styrenes, alkoxy-substituted styrenes, vinyl naphthalene, alkyl-substituted vinyl naphthalenes and the like.

In general, any of the conjugated diolefins known to be useful in block copolymers of the type useful in the adhesive composition of this invention may be used in the block copolymers used therein. Suitable conjugated diolefins, then, include those containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Preferably, the conjugated diolefin will contain 4 to about 8 carbon atoms and most preferably, the conjugated diolefin will either be butadiene or isoprene.

In general, the hydrogenated block copolymers which are useful in the adhesive composition of this invention will contain from about 5 wt% to about 50 wt% monoalkenyl aromatic, hydrocarbon monomer and from about 50 wt% to about 95 wt% conjugated diolefin monomer. In general, the linear block copolymers will have a number-average molecular weight within the range from about 12,000 to about 400,000. The monoalkenyl aromatic hydrocarbon block contained in both the linear and radial block copolymers will, generally, have a weight-average molecular weight within the range from about 1,000 to about 50,000 and the conjugated diolefin polymer blocks will have a number-average molecular weight within the range from about 10,000 to about 300,000.

As indicated supra, after the conjugated diolefin polymer has been prepared, the polymer will then be selectively hydrogenated so as to convert (saturate) at least about 80% of the ethylenic unsaturation initially contained in the polymer using methods well known in the prior art. The selective hydrogenation will be accomplished so as to avoid conversion (saturation) of a significant amount of the aromatic unsaturation. In general, the hydrogenation methods known in the prior art involve the use of a suitable catalyst, particularly a catalyst or catalyst precursor comprising a Group VI or Group VIII metal atom. Suitable catalysts or catalyst precursors are described in U. K. Patent Specification No. 1,030,306, the disclosure of which patent specification is herein incorporated by reference. A particularly preferred method for selectively hydrogenating the block copolymer useful in the adhesive compositions of this invention is described in U.S. Pat. No. 3,700,633, the disclosure of which patent is herein incorporated by reference. In the process taught in U.S. Pat. No. 3,700,633, selective hydrogenation is accomplished in a suitable solvent, preferably the same solvent as was used to prepare the polymer, with a catalyst prepared by combining (reacting) an aluminum alkyl and a nickel or cobalt carboxylate or alkoxide. In general, hydrogenation is accomplished at a temperature within the range from about 25° C. to about 175° C. at a hydrogen partial pressure below about 5,000 psig, and usually at a hydrogen partial pressure within the range from about 250 psig to about 1,500 psig. In general, holding times within the range from about five minutes to about eight hours will be sufficient to permit the desired degree of hydrogenation. To avoid hydrogenation of any significant amount of aromatic unsaturation, relatively mild hydrogenation conditions will be used; e.g., temperatures below about 175° C. and hydrogen partial pressures below about 800 psig will minimize, if not eliminate, any hydrogenation of the aromatic unsaturation.

In general, any one or more of the above described hydrogenated block copolymers could be modified by incorporating one or more carboxyl groups therein and then used to form the adhesive composition of this invention. In general, any of the methods known in the prior art for incorporating carboxyl groups into a polymer may be used to modify the polymers useful in the composition of this invention. Suitable methods for incorporating the carboxyl group, then, include grafting an ethylenically unsaturated carboxylic acid or anhydride onto the polymer through an addition reaction across residual double bonds. Generally, such grafting is accomplished in the presence of a free radical initiator. The carboxyl groups may also be incorporated using the socalled ENE reaction wherein an ethylenically unsaturated carboxylic acid or anhydride reacts with a carbon atom allylic to a residual double bond. The so-called ENE reaction is generally accomplished thermally as taught in U.S. Pat. Nos. 4,292,414 and 4,308,353, the disclosure of which patents are herein incorporated by reference. The carboxyl groups may also be incorporated into a substantially hydrogenated polymer by grafting onto the conjugated diolefin block as taught in U.S. Pat. No. 4,578,429, the disclosure of which patent is herein incorporated by reference. This grafting reaction is too, generally, accomplished in the presence of a free radical initiator. Carboxyl functional groups may also be incorporated into a polymer by first metallating the polymer so as to incorporate a plurality of metal atoms and then reacting the metal atoms with a carboxyl functionalizing agent such as $CO_2$ and then contacting the resulting product with a proton donor such as an acid as taught in U.S. Pat. Nos. 3,976,628 and 4,145,298, the disclosure of which patents are herein incorporated by reference. As is well known in the prior art, metallization and subsequent carboxylation of a block copolymer of the type contemplated for use in the adhesive compositions of this invention which has been hydrogenated so as to contain only aromatic unsaturation will incorporate the carboxyl groups into the aromatic portion of the polymer. Of these several methods, the method taught in U.S. Pat. No. 4,578,429 is particularly preferred.

Unsaturated carboxylic acids and anhydrides that may be grafted or otherwise reacted with the hydrogenated block copolymer may be monofunctional or polyfunctional. In general, suitable acids and anhydrides will contain from 3 to about 10 carbon atoms. Useful monocarboxylic acids and anhydrides include acrylic acid and anhydride, methacrylic acid and anhydride, crotonic acid and anhydride, isocrotonic acid and anhydride, mesaconic acid and anhydride, itaconic acid and anhydride, angelic acid and anhydride, glutaconic acid and anhydride and the like. Suitable dicarboxylic acids and anhydrides include maleic acid and anhydride, fumaric acid and anhydride, chloromaleic acid and anhydride and the like. Carboxylated, particularly maleated, hydrogenated block copolymers are, of course, available commercially.

In general, the modified block copolymer useful in the adhesive composition of this invention will be modified by incorporating, on average, from about 0.01 to about 150 carboxyl groups per polymer chain. In this regard, and as is believed well known in the prior art, when a polymer is carboxylated, the number of carboxyl groups actually incorporated onto any given polymer chain may range from 0, particularly when the average number of carboxyl groups incorporated into the polymer is low, to a value several times the average value. As a result, a carboxylated polymer is, in fact a blend of polymer chains or segments in which any given segment may contain anywhere from no carboxyl groups to a number of carboxyl groups well in excess of the average number of carboxyl groups per polymer chain or segment contained in the blend.

Since carboxylated, selectively hydrogenated block copolymers are, frequently at least, in fact blends of carboxylated, selectively hydrogenated block copolymers and uncarboxylated, selectively hydrogenated block copolymers, it will, frequently not be necessary to add additional or extraneous uncarboxylated, selectively hydrogenated block copolymer to such a blend in order to obtain a satisfactory adhesive composition. The key, then, to determining whether such addition is necessary is the average number of carboxyl groups per polymer chain contained in the carboxylated, selectively hydrogenated block copolymer. If the number is too high, additional of more uncarboxylated, selectively hydrogenated block copolymer will be required. Moreover, and as indicated hereinafter, it may frequently be desirable to add more uncarboxylated, selectively hydrogenated block copolymer to improve the viscosity match of the adhesive composition with other materials contained in a particular laminated structure.

In general, one or more of the carboxylated, selectively hydrogenated block copolymers will be contained in the adhesive composition of this invention with one or more uncarboxylated, selectively hydrogenated block copolymers in an amount sufficient to provide from about 0.01 to about 10 carboxyl groups, on average, per block copolymer segment contained in the blend. The adhesive composition of this invention will, then, contain significantly less carboxyl functionality than similar blends which have, heretofore, been proposed. In this regard, it should be noted that, heretofore, it has been thought that better bonding strengths as between a polar and non-polar layer or as between two polar layers would be achieved with adhesive compositions containing a larger amount of carboxyl functionality. As a result, carboxylated polymers have been used as a principal component in adhesive compositions heretofore proposed. As a practical matter, the prior art concept that more carboxyl functionality is better may well be true when the laminated structures are prepared via processes wherein the various layers are brought together in a solid rather than a molten state or via processes wherein the laminated structure is formed without the various layers being in motion. The concept does not, however, hold as true when the laminated structure is prepared using coextrusion or similar techniques wherein the separate layers are separately extruded and then laminated together while moving in the molten phase through a multi-layer die. While the inventors do not wish to be bound by any particular theory, it is believed that, in those cases where a chemical reaction does or could occur between the carboxyl groups contained in the adhesive layer and a polar group contained in one or more of the polymeric layers bonded therewith, interfacial flow instability results, at least if too much reaction occurs.

As is well known, when the various layers of a laminated structure are coextruded, it is important that the viscosity of each of the several layers be reasonably matched so as to avoid interfacial flow instability problems. Reasonable matching of viscosity does not, however, mean that the various layers must have identical viscosities, in fact, and as is well known, polymers having viscosity mismatches of 3- or 4- fold have been successfully coextruded. Generally, temperature is the principal variable used to control viscosity of the various layers, but heat transfer problems limit this control. Various additives have also been used on occasion to modify the viscosity of one or more layers during a coextrusion operation. Blending of relatively high and low molecular weight polymers has also been used as a means for controlling the viscosity of various layers laminated in a coextrusion operation.

It has now, surprisingly, been discovered that an adhesive composition containing a functional group such as a carboxyl group which will react with a polar group such as a hydroxyl group contained in another layer will not always result in the production of a satisfactory laminate even if the viscosities of the two layers are otherwise reasonably matched as the two layers enter the die. In this regard, and while the inventors still do not wish to be bound by any particular theory, it is believed that reaction between the two groups significantly alters the viscosity at the interface thereby causing failure of the laminated structure as the result of interfacial flow instability. The failure is, generally, particularly acute when the adhesive composition contains more than an average of about 10 functional (carboxyl) groups per polymer chain in the adhesive, particularly when the polymeric layer containing the reactive polar group and sought to be laminated contains a significant amount of such polar groups; i.e., an amount enabling significant reaction to occur. The adverse effect is less significant and is generally negligible when the average number of carboxyl groups in the adhesive composition is within the range from about 6 to about 10 carboxyl groups per polymer chain in the adhesive composition and failure does not occur when the average number of carboxyl groups is within the range from about .05 to about 6 carboxyl groups per polymer chain in the adhesive composition. It will, of course, be appreciated that the extent of failure as a function of carboxyl group content will vary somewhat with the particular block copolymer or mixture thereof used in the adhesive composition, but these numbers are at least, generally, correct.

In light of the fact that the ratio of carboxyl groups in the adhesive composition to the number of polar groups in another polymeric layer affects the quality of the laminated structure ultimately produced and since higher ratios result in failure, carboxylated, selectively hydrogenated polymers having a relatively high average number of carboxyl groups per polymer segment or chain will require incorporation of a greater amount of uncarboxylated, selectively hydrogenated polymer to reduce the average number of carboxyl groups per polymer chain than will carboxylated, selectively hydrogenated polymers containing a lower average number of carboxylate radicals per polymer segment or chain. In general, the adhesive composition of this invention will contain a sufficient amount of uncarboxylated, selectively hydrogenated polymer to provide a final composition having, on average, from about 0.01 to about 10 carboxyl groups per polymer segment in the final or ultimate composition.

Also, notwithstanding that the ratio of carboxyl groups to reactive polar groups is important, it remains equally important to reasonably match the viscosity of the adhesive composition with the viscosity of the various layers being tied therewith. One way that this matching may be accomplished, is to control the temperature of the various polymeric layers as they exit the extruders. Temperature is not, however, always the most effective way to control the viscosity and, in fact, it has been discovered that effective matching of the adhesive composition viscosity with the viscosity of the various layers tied therewith can be achieved by diluting the carboxylated, selectively hydrogenated polymer with one or more uncarboxylated, selectively hydrogenated block copolymers having a lower or higher viscosity (as required) than the carboxylated, selectively hydrogenated block copolymer. Incorporation of one or more uncarboxylated, selectively hydrogenated block copolymer into the adhesive composition of this invention, then, offers two distinct advantages. Firstly, such inclusion reduces the average number of carboxyl groups per polymer chain and secondly such inclusion affords a means by which viscosity matching may be improved.

In general, the carboxylated and uncarboxylated, selectively hydrogenated block copolymer may be blended, when such blending is required, to form the adhesive composition useful in preparation of the laminated structures of this invention using any of the techniques known in the prior art to be suitable for the blending of such polymer compositions. Suitable blending techniques, then include physical admixture of solid particles of each of the polymeric components, solution admixture of the various components and admixture of the various components in the molten phase.

In general, the adhesive composition of this invention may be used to bond any one of certain polymeric materials either to itself or to certain other polymeric materials. The polymeric materials may, then, be polar or nonpolar but as indicated supra, the adhesive composition of the instant invention is particularly useful in the preparation of laminated structures containing at least one layer which contains a polar group which is reactive with the carboxyl radicals contained in the adhesive composition. Suitable polymeric materials that may be bonded with the adhesive composition of this invention include olefin polymers, copolymers of olefins with one or more other monomers, polyesters, polycarbonates, alkenyl aromatic hydrocarbon monomer polymers and the like.

Olefin polymers which may comprise one or more layers of the multilayer laminate of this invention include homopolymers and copolymers of monoolefins and polyolefins having from 2 to about 12 carbon atoms such as ethylene, propylene, 1-butene, 2-butene, isobutene, pentene, hexene, 1,3-butadiene, isoprene, piperylene and the like. Suitable olefin homopolymers, then, include low, medium and high density polyethylenes, crystalline and noncrystalline polypropylene, polybutene, polybutadiene, polyisoprene and the like. Examples of olefin copolymers include ethylenepropylene copolymers, ethylene-butene copolymers, ethylenepropylene-hexadiene copolymers, ethylene-propylene-norbornene copolymers and the like.

Copolymers of one or more olefins and one or more other monomers which other monomer may contain a polar group reactive with a carboxyl group, which copolymer may be used as one or more of the layers of the laminate of this invention include copolymers containing one or more mono- or polyolefins containing from 2 to about 12 carbon atoms and one or more other monomers such as an unsaturated ester, unsaturated acids unsaturated alcohols, unsaturated ionomers and the like. Suitable copolymers of an olefin and one or more other monomers, then, include ethylene-vinyl acetate copolymer, ethylene-vinyl alcohol copolymer, ethylene-acrylic acid copolymer and the like. The adhesive composition useful in preparing the laminated structures of this invention is particularly useful in the preparation of laminated structures containing a copolymer of ethylene and vinyl alcohol since the hydroxyl radical of the alcohol will react with the carboxyl radical of the adhesive.

Polyesters that may be used as one or more layers of the laminated structure of this invention include condensation products of polycarboxylic acids and polyhydric alcohols and addition products of unsaturated esters such as acrylic esters and methacrylic esters. Suitable polyesters, then, include polymethylacrylate, polymethylmethacrylate and the like.

Polycarbonates useful as one or more layers in the laminated structure of this invention include those polymers derived from the direct reaction between aromatic and/or aliphatic dihydroxy compounds with phosgene or by the ester exchange reaction with appropriate phosgene derived precursors. The structural units within the polymer are linked by the carbonate group. Suitable polycarbonates, then, include the reaction product of bis(phenol)-A with phosgene.

Alkenyl aromatic hydrocarbon monomer polymers which may comprise one or more layers of tho multilayer laminates of this invention include homopolymers and copolymers of alkenyl aromatic hydrocarbon monomers such as styrene, alkylsubstituted styrenes, alkoxy-substituted styrenes, vinyl naphthalene and the like. Suitable homopolymers of alkenyl aromatic hydrocarbon monomers, then, include polystyrene, poly-α-methylstyrene and the like.

In general, any of the processes known in the prior art to be useful for the preparation of a laminated structure may be used to produce the laminated structures of this invention. As indicated supra, however, the adhesive composition of this invention used in preparing the laminated structures of this invention is particularly effective for the preparation of laminated structures via coextrusion or similar processes, wherein the various layers are brought together in the molten phase while in motion, when one or more of the layers in the laminated structure contains a polar group reactive with the carboxyl groups of the adhesive composition. As is well known, the separate layers of a laminated structure are separately extruded in a coextrusion process and then laminated together in the molten phase as they move through a multilayer die. As a practical matter, it is essential to the preparation of an acceptable laminated structure for each of the separate layers to have matching (though not identical) viscosities when the layers are ultimately brought into contact with each other. As indicated supra, however, when chemical reaction occurs at the interface between two layers, the relative viscosities of these layers or the interface is affected and if too much reaction occurs, interfacial flow instability will result. Such reaction is, of course, controlled within acceptable limits and interfacial flow instability does not occur when the adhesive composition of this invention is used.

The laminated structures of this invention may be used in any of the applications known in the prior art for such laminates. Suitable uses, then, include packaging films, tubular containers, thick sheets and as materials for molding such as blow molding, vacuum forming and air pressure forming.

PREFERRED EMBODIMENT OF THE INVENTION

In a preferred embodiment of the present invention, the adhesive composition will comprise at least one carboxylated, selectively hydrogenated triblock copolymer and at least one uncarboxylated, selectively hydrogenated triblock copolymer. Each of the triblock copolymers will comprise two polymeric blocks containing predominantly monoalkenyl aromatic hydrocarbon units and a single polymeric block containing predominantly conjugated diolefin monomer units. Each of the monoalkenyl aromatic hydrocarbon monomer polymer blocks may have the same or a different weight-average molecular weight within the range from about 5,000 to about 30,000. The conjugated diolefin blocks in the triblock copolymer may have the same or a different weight-average molecular weight within the range from about 30,000 to about 150,000. In a most preferred embodiment, the monoalkenyl aromatic hydrocarbon monomer polymer blocks will be styrene homopolymer blocks and each of the conjugated diolefin monomer polymer blocks will be butadiene homopolymer blocks. In the preferred embodiment, the adhesive composition will contain, on average, from about 0.05 to about 6 carboxyl groups per polymer chain. In a most preferred embodiment, the carboxyl groups will be imparted into the polymer by grafting maleic acid or maleic anhydride onto a preformed, selectively hydrogenated triblock copolymer using a freeradical initiator such as a peroxide or hydroperoxide. In the preferred embodiment, each of the triblock copolymers will be selectively hydrogenated such that at least about 95% of the ethylenic unsaturation initially contained in the polymer is converted (saturated).

In a preferred embodiment of the present invention, the adhesive composition comprising at least one carboxylated, selectively hydrogenated triblock copolymer and at least one uncarboxylated, selectively hydrogenated triblock copolymer will be used to form a laminated structure comprising at least one layer of polypropylene, at least one layer of an ethylene-vinyl alcohol copolymer and at least one layer of a polycarbonate. In the preferred embodiment, the laminate will be coextruded such that the adhesive composition of this invention forms a tie layer between the polypropylene layer and the ethylene-vinyl alcohol copolymer layer and a tie layer between the ethylene-vinyl alcohol copolymer layer and the polycarbonate layer. The preferred laminated structures will be used in packaging films, thermoformed sheets, coextruded, blow molded containers and the like.

Having thus broadly described the present invention and a preferred and most preferred embodiment thereof, it is believed that the invention will become even more apparent by reference to the following examples. It will be appreciated, however, that the examples are presented solely for purposes of illustration and should not be construed as limiting the invention.

EXAMPLE 1

In this example, three adhesive compositions within the scope of the present invention were prepared and then used as a tie layer to bond a polycarbonate and an ethylenevinyl alcohol copolymer via coextrusion and the results obtained with these adhesive compositions were compared to those results obtained with the separate components of the adhesive compositions. The polycarbonate used was a copolymer formed by reacting bis(phenol)-A and phosgene having a molecular weight of about 12,000, which polycarbonate is available commercially from General Electric Company under the tradename "Lexan". The ethylene-vinyl alcohol copolymer was prepared by saponifying an ethylene-vinyl acetate copolymer having a molecular weight of about 15,000 and an ethylene content of about 38%. The ethylene-vinyl alcohol copolymer used is available commercially from Eval Company of America under the tradename "Eval K". All three of the adhesive compositions within the scope of this invention were prepared with a maleated triblock copolymer. The triblock copolymer which was maleated contained two polystyrene blocks having weight-average molecular weights of 7,200 and a single polybutadiene block having a weight-average molecular weight of 50,000. The triblock copolymer was selectively hydrogenated such that about 98.5% of the ethylenic unsaturation initially contained in the butadiene block was converted (saturated). Maleation was accomplished by contacting the hydrogenated triblock copolymer with maleic anhydride in a twin-screw extruder in the presence of a hydroperoxide. The contacting in the extruder was accomplished at a temperature ranging from about 500° F. to about 525° F. The maleated polymer contained 2 wt% maleic acid after the maleation was completed and is believed to be a blend of maleated polymer chains and unmaleated polymer chains. In each of the three adhesive compositions within the scope of this invention, the maleated triblock copolymer was diluted with a blend of unmaleated triblock copolymers. The unmaleated triblock copolymers contained in the blend were separately selectively hydrogenated so as to convert about 98.5% of the ethylenic unsaturation initially contained in the conjugated diolefin blocks prior to the blending. The blend of unmaleated triblock copolymers was formulated so as to provide an acceptable match of viscosities between the adhesive composition and the polycarbonate. In the first of the three adhesive compositions within the scope of this invention, which adhesive composition is hereinafter referred to as Composition 1, 5 wt% of the maleated triblock copolymer was blended with 95 wt% of the blend of unmaleated triblock copolymers. In the second of the adhesive compositions within the scope of this invention, which composition is hereinafter referred to as Composition 2, 10 wt% of the maleated triblock was combined with 90 wt% of the blend of unmaleated triblock copolymers. In the third of the adhesive compositions within the scope of this invention, which adhesive composition is hereinafter referred to as Composition 3, 25 wt% of the maleated triblock was combined with 75 wt% of tho blend of unmaleated triblock copolymers. The flow rate of the various polymeric materials was controlled during coextrusion so as, in each case, to produce a laminated structure having a polycarbonate layer about 3.0 mm thick, an ethylene-vinyl alcohol copolymer layer having a thickness of about 2.3 mm and a tie layer thickness of about 1.6 mm. After the three laminated structures were prepared with adhesive compositions within the scope of this invention, the structures were observed for appearance and the adhesive strength between the polycarbonate layer and the ethylenevinyl alcohol copolymer layer was determined. Particularly, the force required to separate the polycarbonate layer and the ethylene-vinyl alcohol copolymer layer in the machine direction was determined using a modified standard test procedure; viz., ASTM D-1876. For convenience, this force will frequently hereinafter be referred to as the peel strength between these layers. The test procedure was modified by reducing the cross-head speed from 10 in./min. to 2 in./min. For purposes of comparison, two laminated structures, identical to those prepared with the adhesive compositions within the scope of the present invention, were prepared, except that the first was prepared with an adhesive composition, hereinafter identified as Composition 4, consisting solely of the blend of unmaleated triblock copolymers used in the preparation of the adhesive compositions within the scope of this invention to dilute the maleated triblock copolymer and the second was prepared with an adhesive composition, hereinafter identified as Composition 5, which consisted solely of the maleated triblock copolymer used in the adhesive compositions within the scope of the present invention. After preparation, these comparative laminated structures were visually observed and peel strengths of the same layers were determined in the same manner as was used in determining the peel strengths of those laminates prepared with adhesive compositions within the scope of this invention. Visual observations indicated that the laminates prepared with Composition Nos. 1, 2 and 3 (those within the scope of this invention) were excellent, there was no significant adhesion in the laminate prepared with Composition 4 and the laminate prepared with Composition 5 was grainy. The peel strengths actually determined, the wt% of maleated and unmaleated block copolymer contained in the compositions and the average number of carboxyl groups per polymer chain in each of the blends are summarized in the following Table:

TABLE

| Comp. No. | Maleated Polymer, wt % | Unmaleated Polymer, wt % | Ave. No. $CO_2H$ Groups/Polymer Chain | Peel Strength* (pli) |
| --- | --- | --- | --- | --- |
| 4 | 0 | 100 | 0 | 0.1 |
| 1 | 5 | 95 | .7 | 4.3 |
| 2 | 10 | 90 | 1.3 | 3.7 |
| 3 | 25 | 75 | 3.3 | 3.3 |
| 5 | 100 | 0 | 13.1 | 1.5 |

*Peel strength between polycarbonate and ethylene-vinyl alcohol copolymer layers.

EXAMPLE 2

In this example, two adhesive compositions within the scope of the present invention were prepared and then used as a tie layer to prepare 5 layer laminates via coextrusion comprising a polycarbonate layer, an ethylenevinyl alcohol copolymer layer, a crystalline polypropylene layer and two tie layers and the results were compared to the results obtained with a laminated structure prepared with an adhesive composition containing only the maleated block copolymer used in the adhesive copositions within the scope of this invention. The polycarbonate used was identical to that used in Example 1. The ethylene-vinyl alcohol copolymer used in this example contained about 32% ethylene and is available commercially from Eval Company of America under the Tradename "Eval F". All of the adhesive compositions were prepared with a maleated triblock copolymer identical to that used in Example 1 except that the amount of maleic acid therein Was reduced from 2 wt% to 1 wt%. In each of the adhesive compositions prepared within the scope 0f this invention, the maleated triblock copolymer was diluted with a blend of unmaleated triblock copolymers identical to that used in Example 1. In the first of the two adhesive compositions within the scope of this invention, which adhesive composition is hereinafter referred to as Composition 6, 10 wt% of the maleated triblock copolymer was blended with 90 wt% of the blend of unmaleated triblock copolymers. In the second of the adhesive compositions within the scope of this invention, which adhesive composition is hereinafter referred to as Composition 7, 50 wt% of the maleated triblock was combined with 50 wt% of the blend of unmaleated triblock copolymers. After the two laminated structures prepared with adhesives within the scope of this invention were prepared, the structures were observed for appearance and the peel strength between the polycarbonate and ethylene-vinyl alcohol copolymer layers in the machine direction was determined using the same modified technique summarized in Example 1. For purposes of comparison, a laminated structure was prepared identical to those within the scope of the present invention and prepared in this example, except that it was prepared with an adhesive composition, hereinafter identified as Composition 8, which adhesive composition consisted solely of the maleated triblock copolymer used in the adhesive compositions within the scope of this invention. After preparation, the comparative laminated structure was visually observed and the peel strength of the polycarbonate and ethylene-vinyl alcohol copolymer layers was determined in the same manner as was used in the previous cases. As a result of the visual observations, it was determined that the composition containing 10 wt% of the maleated block copolymer gave an excellent laminated structure while that obtained with the 50—50 composition was only fair and that obtained with the maleated block copolymer alone was poor. The peel strengths actually determined, the wt% of maleated and unmaleated block copolymer contained in the compositions and the average number of carboxyl groups per polymer chain in each of the blends are summarized in the following Table:

TABLE

| Comp. No. | Maleated Polymer, wt % | Unmaleated Polymer, wt % | Ave. No. CO$_2$H Groups/Polymer Chain | Peel Strength* (pli) |
| --- | --- | --- | --- | --- |
| 6 | 10 | 90 | 0.7 | 4.3 |
| 7 | 50 | 50 | 3.3 | 2.5 |
| 8 | 100 | 0 | 6.6 | 1.9 |

*Peel strength between polycarbonate and ethylene-vinyl alcohol copolymer layers.

EXAMPLE 3

In this example, a series of eight adhesive compositions within the scope of this invention were prepared and then used as a tie layer to bond a polycarbonate layer to an ethylene-vinyl alcohol copolymer layer via coextrusion. The polycarbonate used in the laminated structures was identical to that used in Examples 1 and 2. The ethylene-vinyl alcohol copolymer used in this example was identical to that used in Example 2. The first composition tested, which composition is hereinafter identified as Composition 9, contained only a maleated triblock copolymer identical to that used in Example 2. As indicated supra, such maleated block copolymers are believed to be blends which will contain some unmaleated block copolymer. The remaining adhesive compositions tested in this example, which compositions are hereinafter identified, respectively, as Compositions 10-16, were prepared by diluting (physically admixing) this maleated block copolymer with different amounts of an unmaleated, selectively hydrogenated styrene/butadiene/styrene triblock copolymer. The unmaleated triblock copolymer which was added to the maleated triblock copolymer so as to reduce the average number of carboxyl groups per polymer chain in the resulting blend contained polystyrene blocks having a weight-average molecular weight of 5,300 and a polybutadiene block having a weight-average molecular weight of 83,500. The unmaleated triblock copolymer was selectively hydrogenated so as to convert (saturate) at least about 98.5% of the ethylenic unsaturation initially contained therein. In preparing the laminated structures, the flow rate of the various polymeric materials was controlled during coextrusion so as, in each case, to produce a laminated structure having a polycarbonate layer about 3.0 mm thick, an ethylene-vinyl alcohol copolymer layer of about 3.0 mm thick and a tie layer about 1.5 mm thick. After the 8 laminated structures were prepared, the structures were observed for appearance and the peel strength of the polycarbonate and ethylene-vinyl alcohol copolymer layers in the machine direction was determined using the same method as was used in Examples 1 and 2. Visual observation revealed that the laminated structures prepared with Compositions 9 and 16 (100% and 90% maleated triblock, respectively) were fair while the remaining laminated structures ranged from good to excellent. The average peel strengths actually determined, the wt% of maleated and unmaleated block copolymer in each of the compositions, and the average number of carboxyl groups per polymer chain in the blend for each laminate structure are summarized in the following Table:

TABLE

| Comp. No. | Maleated Polymer, wt % | Unmaleated Polymer, wt % | Ave. No. CO$_2$H Groups/Polymer Chain | Peel Strength* (pli) |
| --- | --- | --- | --- | --- |
| 10 | 5 | 95 | 0.3 | 2.9 |
| 11 | 10 | 90 | 0.7 | 3.0 |
| 12 | 20 | 80 | 1.3 | 3.2 |
| 13 | 35 | 65 | 2.3 | 3.3 |
| 14 | 50 | 50 | 3.3 | 3.9 |
| 15 | 65 | 35 | 4.3 | 4.1 |
| 16 | 90 | 10 | 6.0 | 2.7 |
| 9 | 100 | 0 | 6.7 | 2.7 |

*Peel strength between polycarbonate and ethylene-vinyl alcohol copolymer layers.

EXAMPLE 4

In this example, a series of eight adhesive compositions within the scope of this invention were prepared and then used as a tie layer to bond a polycarbonate layer to an ethylene-vinyl alcohol copolymer layer via coextrusion. Both the polycarbonate and the ethylene-vinyl alcohol copolymer used were identical to those used in Examples 2 and 3. The maleated triblock copolymer used in this example was also identical to that used in Examples 2 and 3 and, hence, the first composition tested (which composition is hereinafter identified as Composition 17) was identical to Compositions 8 and 9. The remaining adhesive compositions tested in this example, which compositions are hereinafter identified, respectively, as Compositions 18-24, were prepared by diluting (physically admixing) this maleated block copolymer with different amounts of a blend of unmaleated, selectively hydrogenated styrene/butadiene/styrene triblock copolymers. The blend of unmaleated triblock copolymers which was added to the maleated triblock copolymer so as to reduce the average number of carboxyl groups per polymer chain in the resulting blend was a blend of block copolymers identical to that used in Examples 1 and 2. In preparing the laminated structures, the flow rate of the various polymeric materials was controlled during coextrusion so as, in each case, to produce a laminated structure having a polycarbonate layer about 3.0 mm thick, an ethylene-vinyl alcohol copolymer layer of about 3.0 mm thick and a tie layer about 1.5 mm thick. After the 8 laminated structures were prepared, the structures were observed for appearance and the peel strength of the polycarbonate and ethylene-vinyl alcohol copolymer layers in the machine direction was determined using the same method as was used in the previous examples. Visual observation revealed that the laminated structure prepared with Composition 17 was grainy, the laminated structure prepared with Composition 24 was fair and the remaining laminated structures ranged from good to excellent. The peel strengths actually determined, the Wt% of maleated and unmaleated block copolymer in the compositions, and the average number of carboxyl groups per polymer chain in the blend for each laminate structure are summarized in the following Table:

TABLE

| Comp. No. | Maleated Polymer, wt % | Unmaleated Polymer, wt % | Ave. No. $CO_2H$ Groups/Polymer Chain | Peel Strength* (pli) |
|---|---|---|---|---|
| 18 | 1 | 99 | 0.1 | 0.9 |
| 19 | 5 | 95 | 0.3 | 3.1 |
| 20 | 10 | 90 | 0.7 | 3.1 |
| 21 | 15 | 85 | 1.0 | 3.2 |
| 22 | 20 | 80 | 1.3 | 3.4 |
| 23 | 25 | 75 | 1.7 | 3.3 |
| 24 | 50 | 50 | 3.3 | 3.1 |
| 17 | 100 | 0 | 6.7 | 2.4 |

*Peel strength between polycarbonate and ethylene-vinyl alcohol copolymer layers.

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

Having thus described and illustrated the invention. What is claimed is:

1. A method for bonding polymeric materials which comprises applying between said polymeric materials an adhesive composition comprising at least one carboxylated, selectively hydrogenated block copolymer, said carboxylated block copolymer comprising at least one polymeric block containing predominantly monoalkenyl aromatic hydrocarbon monomer units and at least one polymeric block containing predominantly hydrogenated conjugated diolefin monomer units, and at least one uncarboxylated block copolymer, said uncarboxylated, selectively hydrogenated block copolymer comprising at least one polymeric block containing predominantly hydrogenated conjugated diolefin monomer units and at least one polymeric block containing hydrogenated conjugated diolefin monomer units, wherein said composition comprises, on average, from about 0.1 to about 10 carboxyl radicals per polymer chain contained in the composition.

2. The method of claim 1 wherein said carboxylated, selectively hydrogenated block copolymer is a triblock copolymer comprising two polymeric blocks containing predominantly monoalkenyl aromatic hydrocarbon monomer units and a single polymeric block containing predominantly hydrogenated conjugated diolefin monomer units.

3. The method of claim 2 wherein said polymeric blocks containing predominantly monoalkenyl aromatic hydrocarbon monomer units have the same or a different weight-average molecular weights within the range from about 1,000 to about 50,000 and said polymeric block containing predominantly hydrogenated conjugated diolefin monomer units have the same or a different weight-average molecular weight within the range from about 10,000 to about 300,000.

4. The method of claim 3 wherein said carboxyl groups are imparted into the polymer by grafting maleic acid or maleic anhydride thereto.

5. The method of claim 4 wherein the monoalkenyl aromatic hydrocarbon monomer in both the carboxylated and uncarboxylated block copolymers is styrene and the conjugated diolefin in both the carboxylated and uncarboxylated block copolymers is butadiene.

6. The method of claim 5 wherein said composition comprises, on average, from about 0.05 to about 6 carboxyl radicals per polymer chain contained in said composition.

7. The method of claim 1 wherein at least one uncarboxylated, selectively hydrogenated block copolymer is a blend of such block copolymers.

8. The method of claim 7 wherein said blend is a blend of two uncarboxylated, selectively hydrogenated triblock copolymers.

9. The method of claim 1 wherein the polymeric materials are selected from the group consisting of olefin polymers, copolymers of olefins with one or more other monomers, polyesters, polycarbonates, and alkenyl aromatic hydrocarbon polymers.

* * * * *